US012757039B2

(12) United States Patent
Chenumolu et al.

(10) Patent No.: US 12,757,039 B2
(45) Date of Patent: Oct. 6, 2026

(54) RADIO ACCESS NETWORK OPTIMIZATION BASED ON EDGE DEVICE CLASSIFICATION

(71) Applicant: BOOST SUBSCRIBERCO L.L.C., Englewood, CO (US)

(72) Inventors: Siddhartha Chenumolu, Ashburn, VA (US); Mehdi Alasti, Arlington, VA (US)

(73) Assignee: BOOST SUBSCRIBERCO L.L.C., Englewood, CO (US)

( * ) Notice: Subject to any disclaimer, the term of this patent is extended or adjusted under 35 U.S.C. 154(b) by 274 days.

(21) Appl. No.: 18/754,986

(22) Filed: Jun. 26, 2024

(65) Prior Publication Data

US 2026/0006465 A1 Jan. 1, 2026

(51) Int. Cl.

| | |
|---|---|
| ***H04W 16/22*** | (2009.01) |
| ***H04W 24/02*** | (2009.01) |
| ***H04W 24/06*** | (2009.01) |
| ***H04W 24/08*** | (2009.01) |
| ***H04W 84/02*** | (2009.01) |
| ***H04W 88/02*** | (2009.01) |
| ***H04W 88/08*** | (2009.01) |
| ***H04W 88/12*** | (2009.01) |
| ***H04W 88/18*** | (2009.01) |
| ***H04W 92/02*** | (2009.01) |
| ***H04W 92/10*** | (2009.01) |
| ***H04W 92/12*** | (2009.01) |

(52) U.S. Cl.

CPC ........... *H04W 24/02* (2013.01); *H04W 16/22* (2013.01); *H04W 24/06* (2013.01); *H04W 24/08* (2013.01); *H04W 84/02* (2013.01); *H04W 88/02* (2013.01); *H04W 88/08* (2013.01); *H04W 88/12* (2013.01); *H04W 88/18* (2013.01); *H04W 92/02* (2013.01); *H04W 92/10* (2013.01); *H04W 92/12* (2013.01)

(58) Field of Classification Search

CPC . H04B 17/0082–409; H04L 41/14–26; H04W 16/02–32; H04W 24/02–10; H04W 84/005–22; H04W 88/005–188; H04W 92/02–24

See application file for complete search history.

(56) References Cited

U.S. PATENT DOCUMENTS

| | | | | |
|---|---|---|---|---|
| 2021/0203565 A1* | 7/2021 | Arora | ...................... | H04L 41/16 |
| 2022/0210079 A1* | 6/2022 | Koren | ...................... | H04L 41/16 |

* cited by examiner

*Primary Examiner* — Timothy J Weidner
(74) *Attorney, Agent, or Firm* — Quarles & Brady, LLP

(57) ABSTRACT

A computing device, method, and computer readable media that provide radio access network improvements or optimization. A data port of a computing device receives communication data wirelessly communicated between wireless devices and a node in a telecommunications infrastructure, and receives a batch of operational parameters for the node. A processor in communication with the data port provides the communication data to a trained model configured to classify devices. The processor further obtains, from the trained model when the processor applies the communication data to the trained model, a classification for each of the wireless devices including a device type and a mobility state for each of the wireless devices. The processor further generates, based on the classifications, an adjustment for the batch of operational parameters.

20 Claims, 5 Drawing Sheets

RADIO ACCESS NETWORK OPTIMIZATION BASED ON EDGE DEVICE CLASSIFICATION

BACKGROUND

In a wireless communication infrastructure, such as a cellular network, a radio access network (RAN) can provide wireless coverage throughout adjacent coverage areas of a geographic region when each coverage area is a sector of the RAN.

Cells in the RAN are dispersed throughout the geographic region at numerous locations. The cells are responsible for wirelessly connecting a wireless device, also referred to as an edge device, to a core network segment of the wireless communication infrastructure. The wireless device can be, for example, a smartphone, a tablet, an Internet of Things (IoT) device, a smart vehicle, a drone, or any other apparatus capable of wirelessly communicating with the RAN. In enabling wireless connectivity to the RAN, a cell that is sited in a sector of the RAN can transmit and receive radio signals to and from a wireless device that is within the coverage area of the cell.

BRIEF DESCRIPTION OF THE DRAWINGS

The accompanying drawings, which are incorporated in and form a part of this specification, illustrate examples of the disclosure and, together with the description, explain principles of the examples.

Figure 1A:
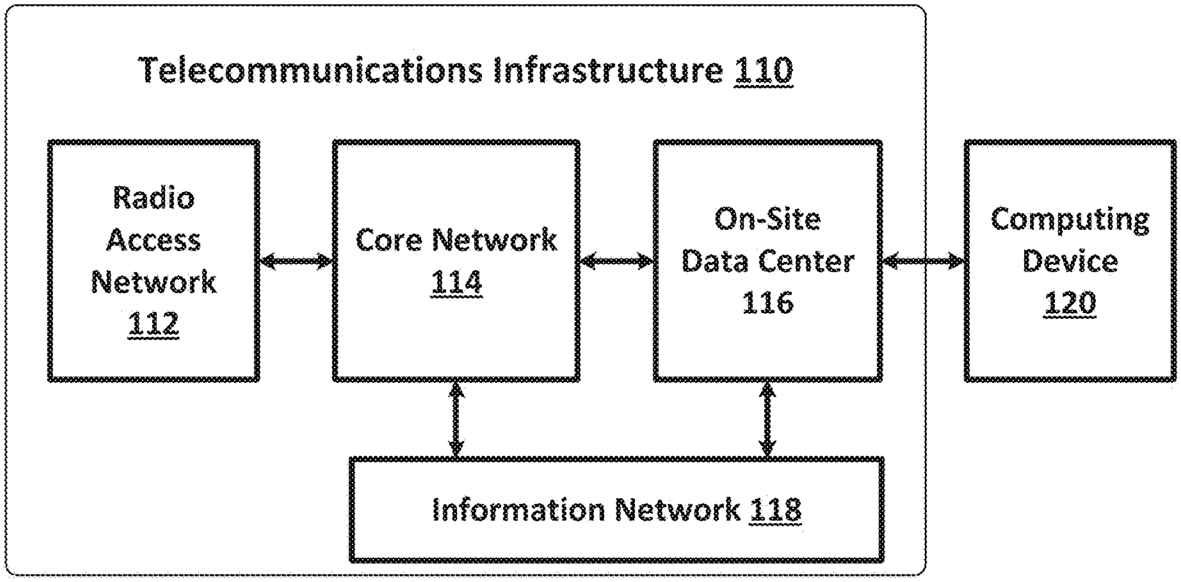
FIGS. 1A and 1B illustrate examples of a computing device connected to a telecommunications infrastructure.

In the drawings, like reference symbols and numerals indicate the same or similar components. Like elements in the various figures are denoted by like reference symbols and numerals for consistency. Unless otherwise indicated, like elements and method steps are referred to with like reference numerals.

DETAILED DESCRIPTION OF THE INVENTION

The following describes technical solutions in this specification with reference to the accompanying drawings. For the sake of clarity and conciseness, matters related to the present embodiments that are well known in the art have not been described.

Performance of the RAN, when suboptimal, can affect various aspects of the wireless connectivity between the RAN and the wireless device. The various aspects can include the efficiency, coverage, and capacity of the RAN. The various aspects can also include the quality of service (QoS) of the wireless communication infrastructure.

Efforts to optimize the overall performance of the RAN aim to improve the wireless communication infrastructure by maximizing the various aspects of the wireless connectivity. These efforts can require a comprehensive approach that includes performance monitoring, proactive maintenance, and targeted optimization strategies.

Presently, comprehensive approaches can be inefficient, costly and time consuming due to the considerable amount of repetitive and continuous testing of the RAN that is required to optimize the overall performance of the RAN. For example, in establishing wireless connectivity between the RAN and the wireless device, the RAN can transmit the radio signals while beamforming the radio signals. The radio signals transmitted by the RAN to a wireless device are in a millimeter-wave spectrum. A cell in the RAN is typically equipped with an array of antennas to improve spectral and energy efficiency of the wireless connectivity. Accordingly, the extensive and repetitive testing of the RAN needed to enhance the performance of the RAN can be complex and time-consuming. The knowledge and expertise of skilled personnel along with specialized equipment that are presently required to test the RAN can add to the overall cost of optimizing the performance of the RAN.

As a consequence, there is a need in the art for an improved comprehensive approach for optimizing the overall performance of a RAN.

Embodiments described herein provide systems, methods, and computer readable media for improvement or optimization of radio access networks based on edge device classification. For example, using a trained classifier model, a computing device may process communication data in the radio access network to classify edge devices (also referred to as user equipment (UEs) or wireless devices) corresponding to that communication data. The classifications may indicate an identity of each wireless device, a type of each wireless device, a data consumption rate of each, a data type for data consumed by each wireless device, and a mobility state of each wireless device. The computing device may then adjust operational parameters of the radio access network (e.g., of one or more nodes of the radio access network) to improve or optimize performance of the radio access network or of one or more nodes thereof. In some examples, the computing device may use a trained parameter model to process the classifications to generate the adjustment of the operational parameters. The trained parameter model may, in some examples, process the classifications along with present operational parameters of the node or nodes to generate the adjustment of the operational parameters. In some examples, the computing device may use a digital twin (e.g., in conjunction with the trained parameter model) to simulate potential adjustments to the node or nodes and determine the resulting performance of the node or nodes, and then generate the adjustment to the operational parameters based on the simulation and resulting performance.

Accordingly, using technology and techniques described herein, the performance of the radio access network can be improved or optimized.

Exemplary embodiments are described in detail with reference to the accompanying drawings. For the sake of clarity and conciseness, matters related to the present embodiments that are well known in the art have not been described.

Telecommunications Infrastructure 110

Figure 1B:
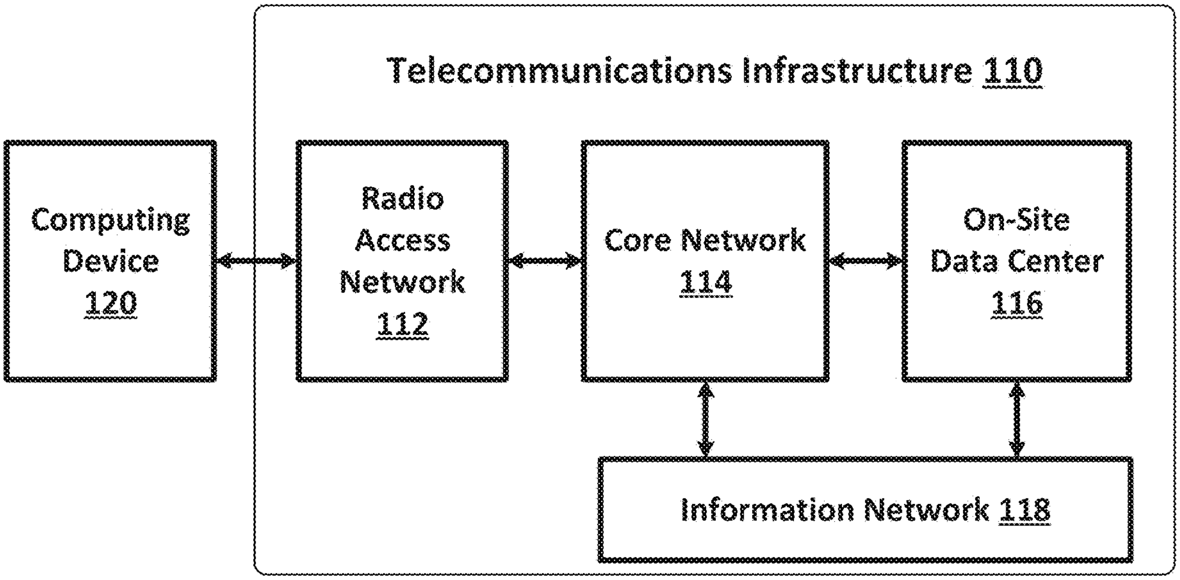

FIGS. 1A and 1B illustrate examples of a telecommunications infrastructure 110. Components of the telecommunications infrastructure 110 may include a radio access network 112, a core network 114, and an on-site data center 116. As illustrated in FIGS. 1A and 1B, a computing device 120 is removably connectable to the telecommunications infrastructure 110. The example of FIG. 1A illustrates communication between the on-site data center 116 and the computing device 120 whereby the computing device 120 is electronically connected to the on-site data center 116. FIG. 1B illustrates communication between the radio access network 112 and the computing device 120. The computing device 120 in FIG. 1B may be electronically connected to an individual node in the radio access network 112.

The telecommunications infrastructure 110 may implement any suitable wireless communication technology or technologies to provide radio access to user equipment (UE). As one example, the telecommunications infrastructure 110 may operate according to 3rd Generation Partnership Project (3GPP) New Radio (NR) specifications, often referred to as 5G or 5G NR. In some examples, the telecommunications infrastructure 110 may operate under a hybrid of 5G NR and Evolved Universal Terrestrial Radio Access Network (eUTRAN) standards, often referred to as Long Term Evolution (LTE). 3GPP refers to this hybrid RAN as a next-generation RAN, or NG-RAN. Of course, many other examples may be utilized within the scope of the present disclosure.

Computing Device 120

Figure 2:
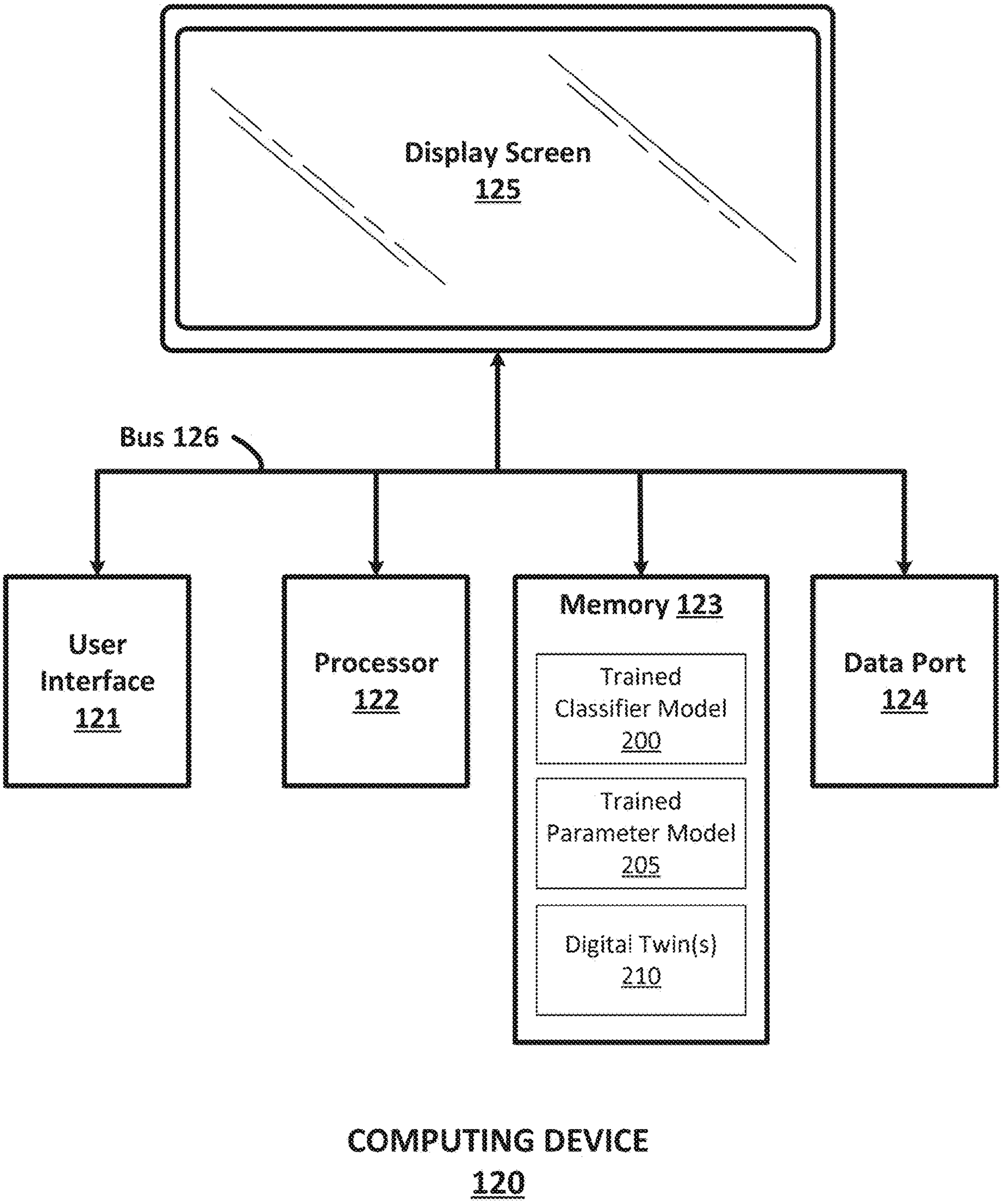
FIG. 2 illustrates an example of the computing device of FIGS. 1A and 1B.

FIG. 2 illustrates an example of the computing device 120 that is consistent with the present disclosure. The computing device 120 is an electronic apparatus that may include a user interface 121, a processor 122, memory 123, a data port 124 and a display screen 125. A bus 126 provides an electronic interconnection between the user interface 121, the processor 122, the memory 123, the data port 124 and the display screen 125. Those skilled in the art will appreciate that there may be additional circuitry in the computing device 120 that is not shown in FIG. 2.

The display screen 125 is an electrical device that may present content for viewing when the display screen 125 receives the content from the processor 122.

The processor 122 may be implemented as any suitable electronic circuitry including, but not limited to at least one of a microcontroller, a microprocessor 122, a single processor 122, and a multiprocessor 122. The processor 122 may include at least one of a video scaler integrated circuit (IC), an embedded controller (EC), a central processing unit (CPU), a graphics processing unit (GPU), an accelerated processing unit (APU), an application specific integrated circuit (ASIC), field programmable gate arrays (FPGA), or the like, and may have a plurality of processing cores. As will be explained in detail, the processor 122 may control the overall operations of the computing device 120. In some examples, the processor 122 is a distributed processing system comprising two or more processors. For example, the processor 122 may be or access a cloud computing resource comprising multiple processors or servers that are in communication with one another (e.g., over a local or wide area network) and that are able to perform processing functions in a distributed manner.

Memory 123 may be a non-transitory processor readable or computer readable storage medium. Memory 123 may store filters, rules, data, or a combination thereof. Memory 123 may comprise read-only memory 123 ("ROM"), random access memory 123 ("RAM"), other non-transitory computer-readable media, or a combination thereof. In some examples, memory 123 may store firmware. Memory 123 may store software for the computing device 120. The software for the computing device 120 may include program code. The program code may include program instructions that are readable and executable by the processor 122, also referred to as machine-readable instructions. Memory 123 may be any electronic, magnetic, optical, or other physical storage device that stores executable instructions and/or data. In some examples, the memory 123 is co-located with the processor 122. In some examples, the memory 123 may include one or more memory devices that are remotely located relative to other aspects of the computing device (e.g., the processor 122). For example, the memory 123 may be or may include cloud-based memory resources connected by a network to the processor 122.

In some examples, the memory may store one or more of a trained classifier model 200, a trained parameter model 205, and digital twin(s) 210. The processor 122 may execute the trained classifier model 200, the trained parameter model 205, and/or digital twin(s) 210 to implement the functionality of these components described herein. In some examples, one or more remote processing resources execute the trained classifier model 200, the trained parameter model 205, and/or digital twin(s) 210, and the processor 122 communicates with the remote processing resource(s) (e.g., over a network) to provide inputs to, receive outputs from, and/or control the trained classifier model 200, the trained parameter model 205, and/or digital twin(s) 210.

The trained classifier model 200 may be a machine learning model that has been trained to classify communication data to characterize wireless devices that transmitted or received data of the communication data. The trained classifier model may be or may implement, for example, decision tree learning prescribed by user intent, association rule learning, an artificial neural network (e.g., a convolutional neural network, a generative adversarial network), inductive logic programming, support vector machine, clustering, Bayesian network, reinforcement learning, representation learning, similarity and metric learning, sparse dictionary learning, and genetic algorithms. The machine learning model can be trained with training data and using known methods such as supervised learning, self-supervised learning, semi-supervised learning, etc. As one example, to perform supervised learning, the training data includes example inputs (e.g., example sets of communication data) and corresponding desired (for example, actual) outputs (e.g., classifications of wireless devices), and the machine learning model progressively develops a model that maps inputs to the outputs included in the training data. As another example, to perform self-supervised learning, a model is trained on a task using the data itself to generate supervisory signals (e.g., unlabeled training data), rather than relying on, e.g., external labels provided by a user (e.g., labeled training data). As yet another example, to perform semi-supervised learning, the training data may include desired output values for a subset of the training data (e.g., labeled training data) while the remaining training data may be unlabeled or imprecisely labeled (e.g., unlabeled training data).

The trained parameter model 205 may be a machine learning model that has been trained to generate values for operational parameters to improve or optimize performance of a node or nodes in a radio access network (e.g., in the radio access network 112). The trained parameter model 205 can be or implement, for example, decision tree learning prescribed by user intent, association rule learning, an artificial neural network (e.g., a convolutional neural network, a generative adversarial network), inductive logic programming, support vector machine, clustering, Bayesian network, reinforcement learning, representation learning, similarity and metric learning, sparse dictionary learning, and genetic algorithms. The machine learning model can be trained with training data and using known methods such as supervised learning, self-supervised learning, semi-supervised learning, etc. As one example, to perform supervised learning, the training data includes example inputs (e.g., example sets of classifications as generated by the trained classifier model 200, and potentially current operational parameters and/or characteristics of the node(s)) and corresponding desired (for example, actual) outputs (e.g., an adjustment or potential adjustments for operational parameters of a node or nodes in a radio access network), and the machine learning model progressively develops a model that maps inputs to the outputs included in the training data. As another example, to perform self-supervised learning, a model is trained on a task using the data itself to generate supervisory signals (e.g., unlabeled training data), rather than relying on, e.g., external labels provided by a user (e.g., labeled training data). As yet another example, to perform semi-supervised learning, the training data may include desired output values for a subset of the training data (e.g., labeled training data) while the remaining training data may be unlabeled or imprecisely labeled (e.g., unlabeled training data).

Each digital twin 210 may be configured according to characteristics of a node or nodes in a radio access network (e.g., the radio access network 112) to provide accurate simulation of the node or nodes. For example, the characteristics may define the node by specifying one or more of a location of the node, a geographic topology around the node, a height and structure of the node, a configuration of the node (e.g., as defined by the batch of operational parameters), an antenna configuration for the node, and/or other physical and operational aspects of the node. Execution of the digital twin may generate a virtual node or nodes that imitate the node or nodes being simulated. For example, the computing device 120 may execute the digital twin to generate the virtual node(s) in a virtual environment. Further, within the virtual environment, the computing device 120 may generate virtual wireless devices based on classifications obtained from the trained classifier model 200 to simulate the communications between the node(s) and the wireless devices. As described further below with respect to FIG. 5, in some examples, the trained parameter model 205 may iteratively configure the digital twin (e.g., with varying operational parameters) to assess performance of the digital twin with different operational parameters and identify improved or optimized operational parameters for the actual node(s) based on the simulations with the digital twin.

The user interface 121 may include circuitry that transmits and receives control information that permits a person to interact with the computing device 120. The user interface 121 may include a keyboard, a touchscreen, a mouse, and the like. The user interface 121 may include a graphical user interface (GUI) that is displayed on the display screen 125. When displayed on the display screen 125, a person may manually input the control information into the GUI. The user interface 121 may include a series of mechanical switches, buttons, and knobs on the computing device 120 that enables the computing device 120 to receive the control information from the person manually. The user interface 121 may include a voice user interface (VUI) that enables interaction with the computing device 120 through voice commands. The user interface 121 may include any other apparatus, circuitry and/or component that permits the person to interact with the computing device 120. The data port 124 may include electronic circuitry that allows the computing device 120 to electronically communicate by wire or wirelessly with the on-site data center 116 (as shown in the example of FIG. 1A), and/or with the radio access network 112 (as shown in the example of FIG. 1B). The data port 124 includes circuitry that may facilitate the transfer of information between the on-site data center 116 and the computing device 120 when the computing device 120 is electronically connected to the on-site data center 116 and/or that may facilitate the transfer of information between the radio access network 112 and the computing device 120 when the computing device 120 is electronically connected to the radio access network 112. The processor 122 may encrypt information prior to the data port 124 electronically communicating the encrypted information to the on-site data center 116 or radio access network 112. The processor 122 may decrypt information when the data port 124 receives encrypted information from the on-site data center 116 or radio access network 112.

Radio Access Network 112

Figure 3:
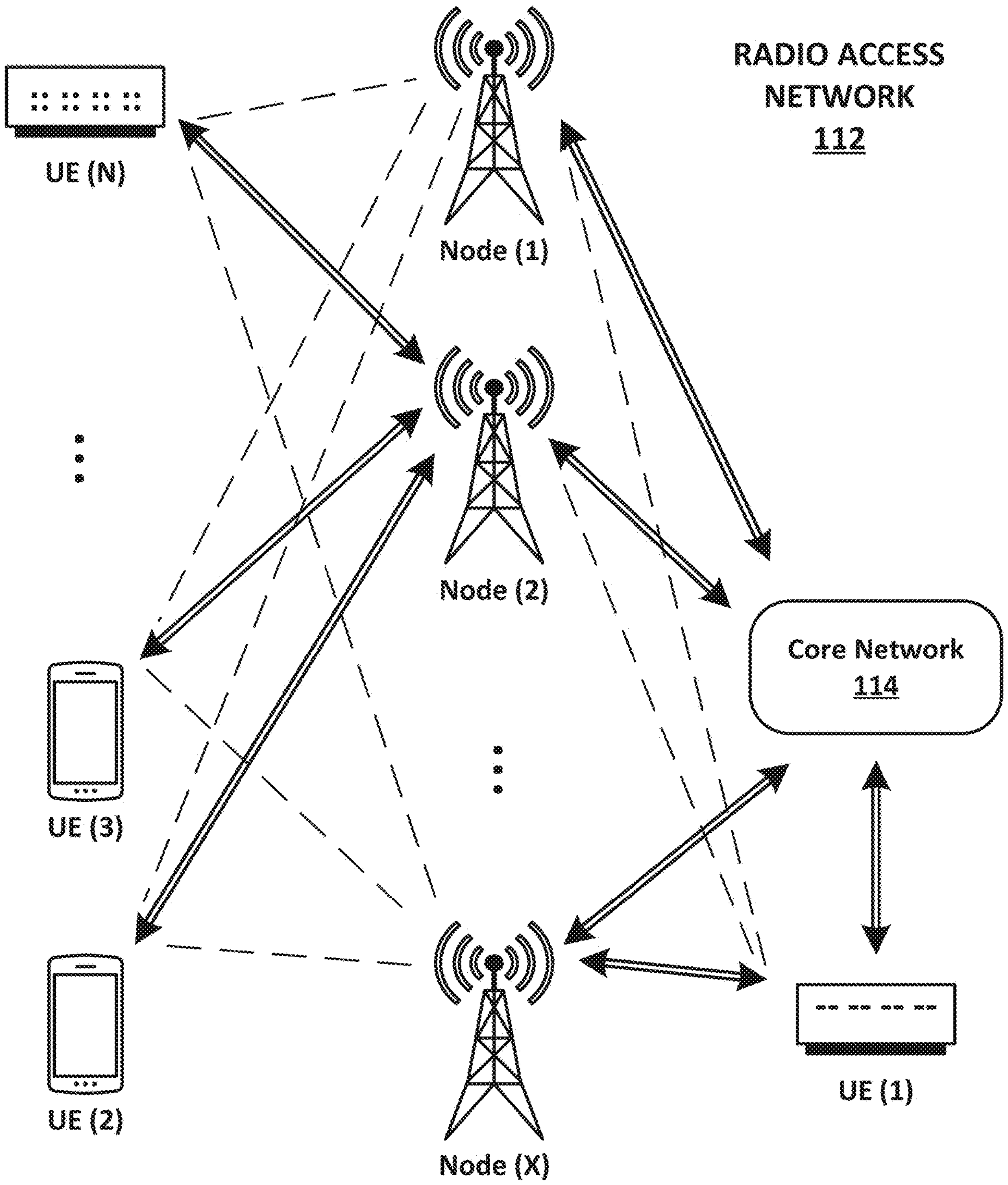
FIG. 3 is an example radio access network of FIGS. 1A and 1B.

FIG. 3 is an example radio access network 112. The radio access network 112 is a segment of the telecommunications infrastructure 110. The radio access network 112 may include a number of distributed nodes having node (1) through node (X), with "X" being an integer number greater than 1. Each node (1) through node (X) in the radio access network 112 may be individually identifiable by a unique Internet Protocol (IP) address or other identifier. An IP address or other identifier for any node (1) through node (X) differs from the IP address for any other node (1) through node (X).

As will be explained in detail, each node (1) through node (X) may provide communication coverage for a respective geographic coverage area in a geographic region. For simplicity and ease of understanding, FIG. 3 shows a case in which only three nodes are present in the radio access network 112. However, the number of nodes in the radio access network 112 may vary depending on the architecture of the radio access network 112. For example, the radio access network 112 may typically include more than three nodes, if not hundreds or thousands of nodes. Each node (1) through node (X) may electronically communicate directly or indirectly with any other node (1) through node (X).

FIG. 3 illustrates user equipment (UE) having UE (1) through UE (N), with "N" being another integer number greater than 1. Each user equipment UE (1) through UE (N) may be a wireless communication device, and the user equipment UE (1) through UE (N) may include wireless communication devices of various types. For example, one or more of the user equipment UE (1) through UE (N) may be a mobile electronic device, and one or more of the user equipment UE (1) through UE (N) may be a stationary electronic device. More particularly, the user equipment UE (1) through UE (N) may be a tablet, a telephone, a smartphone, an appliance (e.g., a washer, dryer, refrigerator, oven, etc.), an Internet of Things (IoT) device, a smart vehicle, an unmanned aerial vehicle, a modem, a laptop, a computing device, a television set, a set-top box, a digital video recorder (DVR), a wireless access point, a router, a gateway, a network switch, a set-back box, a control box, a television converter, a television recording device, a media player, an Internet streaming device, a mesh network node, and/or any other apparatus that is configured to wirelessly communicate with any node (1) through node (X). The total amount of UEs in the radio access network 112 may vary depending on the number of UEs that are connected to the radio access network 112. For simplicity and ease of understanding, the FIG. 3 shows a case in which only four UEs are present in the radio access network 112. However, the radio access network 112 may accommodate more than four UEs, if not hundreds or thousands of UEs. Each user equipment UE (1) through UE (N) in the radio access network 112 may be individually identifiable by a unique identifier or address, such as, for example, an IP address, an international mobile subscriber identity (IMSI), or a subscription permanent identifier (SUPI). The unique identifier(s) or address(es) for any UE (1) through node (N) differs from the unique identifier(s) or address(es) for any other UE (1) through node (N).

As illustrated in FIG. 3, node (1) through node (X) are each an electronic apparatus that may facilitate wireless communication between a core network 114 and any user equipment UE (1) through UE (N). To facilitate wireless communication between user equipment UE (1) through UE (N) and the radio access network 112, any node (1) through node (X) may wirelessly connect any user equipment UE (1) through UE (N) to the core network 114.

A node (1) through node (X) may electronically communicate with more than one user equipment UE (1) through UE (N). Any user equipment UE (1) through UE (N) may electronically communicate directly with the core network 114 by wire or wirelessly. Any node (1) through node (X) may be of a same radio access type or may be of different radio access type as any other node (1) through node (X). Any node (1) through node (X) may be a macrocell, a microcell, a picocell, a femtocell, and/or other component that enables the transmission of signals between core network 114 and any user equipment UE (1) through UE (N).

As illustrated in FIG. 3, the radio access network 112 may include a number of distributed nodes having node (1) through node (X). A node is responsible for transmitting and receiving radio signals to and from any user equipment UE (1) through UE (N) within a coverage area of the node. The coverage area is the geographic region over which the node provides wireless service to any user equipment UE (1) through UE (N).

Core Network 114

The core network 114 is a segment of the telecommunications infrastructure 110. The core network 114 is an individual and distinct infrastructure that may facilitate delivery of a variety of services to any user equipment UE (1) through UE (N). These services may include, but are not limited to, voice calls, text messaging, internet access, video conferencing, multimedia content delivery, and other services.

Although not illustrated, components of the core network 114 may include a combination of application functions with distributed functionalities running on compute servers. The core network 114 may comprise hundreds or thousands of routers, switches, and servers. Each of the routers, switches, and servers in the core network 114 may electronically communicate with any others of the routers, switches, and servers. The routers, switches, and servers in the core network 114 may be individually identifiable by a unique IP address. The respective IP address for any of the routers, switches, and servers may differ from the IP address for any other routers, switches, and servers in the core network 114.

Servers in the core network 114 may be a virtual server, a physical server or a combination of both. The virtual server may be in the form of software that is running on a server in a core network 114 as a Virtual Machine (VM). The physical server may be hardware in a core network 114. The core network 114 may be a facility that is sited in a building at a geographic location. The facility may contain the routers, switches, servers, and other hardware equipment required for processing electronic information and distributing the electronic information throughout the telecommunications infrastructure 110.

Any node (1) through node (X), when accessing the servers, may receive downloadable information from the servers as IP packets. This downloadable information may include, but is not limited to, configurations, graphics, media files, software, scripts, documents, live streaming media content, emails, and text messages. Through any node (1) through node (X), the servers may provide a variety of services to user equipment UE (1) through UE (N). The variety of services may include web browsing, media streaming, text messaging, and online gaming.

On-Site Data Center 116

The on-site data center 116 is a segment of the telecommunications infrastructure 110. The on-site data center 116 may be a data center that is owned by an entity or leased exclusively by the entity. The on-site data center 116 may be responsible for monitoring and managing the overall operation of the software and the infrastructure hardware within the telecommunications infrastructure 110. The on-site data center 116 may contain routers, switches, servers, and other hardware equipment. The routers, switches, servers, and other hardware equipment in the on-site data center 116 may be identifiable respectively by a unique IP address. The on-site data center 116, itself, may be identifiable by another unique IP address for management and reachability purposes. The IP address for the on-site data center 116 may differ from any other IP address in the telecommunications infrastructure 110 for security and isolation.

The on-site data center 116 may be located physically in a facility that is sited at one or more geographic locations and may include a building, dwelling, and/or any portion of a structure that is owned, leased, or controlled by the entity. The entity may be a business, a company, an organization, and/or an individual. The entity may assist in the operation of the on-site data center 116.

Node

Figure 4:
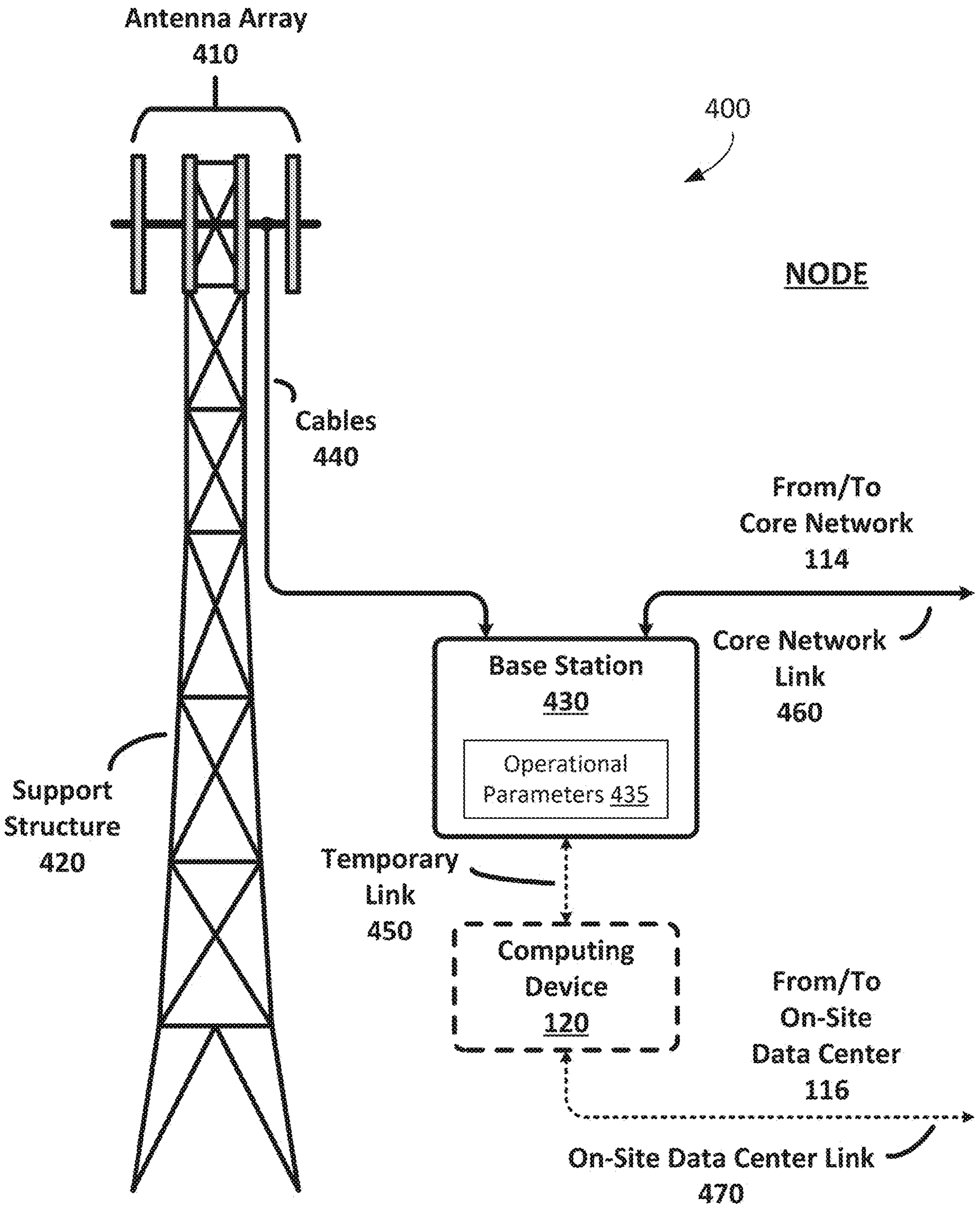
FIG. 4 illustrates an example node in the radio access network of FIG. 3.

FIG. 4 illustrates an example node 400 in the radio access network 112. The node 400 is an example of any of the node (1) through node (X). Components of the node 400 may include an antenna array 410, a support structure 420, and a base station 430.

As illustrated in FIG. 4, the antenna array 410 may comprise a plurality of antennas affixed to the support structure 420. The antenna array 410 is mounted onto the support structure 420 so that the support structure 420 supports the antenna array 410. The support structure 420 may be a tower, pole or another structure such as a building. Cables 440 may provide an electronic connection between the antenna array 410 and the base station 430. As will be explained in detail, the temporary link 450 may provide a removable electronic connection between the base station 430 and a computing device 120.

A core network link 460 in FIG. 4 is an electronic connection between the base station 430 and the core network 114. The base station 430 may receive, via the core network link 460, digital information from the core network 114 and convert the digital information into signals to generate radio waves. One or more of the cables 440 may transfer signals from the base station 430 to the antenna array 410. An antenna (or antennas) in the antenna array 410 may transmit the radio waves to any user equipment UE (1) through UE (N). An antenna (or antennas) in the antenna array 410 may also receive radio waves from any user equipment UE (1) through UE (N). One or more of the cables 440 may transfer the radio waves from the antenna array 410 to the base station 430 as signals. The base station 430 may convert the signals into digital data when the antenna array 410 receives the radio waves from any user equipment UE (1) through UE (N). The base station 430 may output the digital data to the core network 114 via the core network link 460.

The base station 430 may include one or more processors, memories, and communication interfaces. The processors may be configured to execute instructions stored on the memory and to communicate via the communication interfaces to implement the functionality of the base station 430 described herein. In some examples, the base station 430 may be implemented according to an Open Radio Access Network (ORAN) architecture and/or virtualized radio access network (vRAN) such that, for example, the base station 430 includes a radio unit (RU), a distribution unit (DU), and a centralized unit (CU) that may or may not be co-located. For example, the RU may be co-located with the antenna array 410 (e.g., supported on the support structure 420), while the DU may be implemented by hardware located remotely from the support structure 420, and the CU may be implemented by hardware located remotely from the support structure 420 and the hardware implementing the DU.

The base station 430 may further include or store operational parameters 435 (e.g., in the one or more memories of the base station 430) that correspond to the node 400. The operational parameters 435 include node settings that govern performance metrics for the node 400. For example, the node settings (also referred to as node configurations or node attributes) may include, for example, one or more of transmission power level(s) for signal emissions from the node, antenna gain parameter(s), coverage area(s) of the node, beamwidth of signals to the node, beamwidth of signals from the node, spectrum allocation(s) for the node, spectrum allocation(s) for wireless devices in communication with the node, handover configuration parameter(s), load balancing parameter(s), power control parameter(s), measurement threshold parameter(s), slicing parameter(s), rate control parameter(s), scheduler parameter(s), and any other parameter that may modify the performance of the node, radio access network 112, and/or the telecommunications infrastructure 110. The node settings may be applicable to the node 400 generally or may be applicable to communications with particular wireless devices or to communications with particular types of wireless device. Each node (1) through node (X) of the radio access network 112 may be associated with respective operational settings. Accordingly, operational parameters of the radio access network 112 may include the operational parameters of the node (1) through node (X) of the radio access network 112.

In FIG. 4, the computing device 120 may be electronically connected directly to the base station 430 of the node 400 via a temporary link 450. In this scenario, FIG. 4 may represent a configuration similar to FIG. 1B, in which the computing device 120 is communicating with the radio access network 112. The computing device 120 may communicate with the base station 430 via the data port 124 (see FIG. 2) to transfer information between the base station 430 and the computing device 120.

The temporary link 450 in FIG. 4 is a removable electronic connection between the computing device 120 and the base station 430. The data port 124 may communicate virtually or physically by wire or wirelessly, via the temporary link 450, with the base station 430 to facilitate the transfer of information between the node 400 and the computing device 120. As FIG. 4 illustrates, the temporary link 450 may be a direct electronic connection between the computing device 120 and the base station 430. The temporary link 450 may exist when the computing device 120 is in communication with the base station 430. Disconnection of the data port 124 from the base station 430 may result in the dissolution of the temporary link 450.

In FIG. 4, the computing device 120 may also or alternatively be electronically connected to the on-site data center 116 via an on-site data center link 470. In this scenario, FIG. 4 may represent a configuration similar to FIG. 1A, in which the computing device 120 is communicating with the on-site data center 116. The on-site data center link 470 in FIG. 4 is a removable electronic connection between the computing device 120 and the on-site data center 116. The data port 124 may communicate by wire or wirelessly, via the on-site data center link 470, with the on-site data center 116 to facilitate the transfer of information between the node 400 and the computing device 120. The on-site data center link 470 may exist when the computing device 120 is in communication with the on-site data center 116. Disconnection of the data port 124 from the on-site data center 116 may result in the dissolution of the on-site data center link 470. The data port 124 may communicate via the on-site data center link 470 with the on-site data center 116 while simultaneously communicating via the temporary link 450 with the base station 430.

Figure 5:
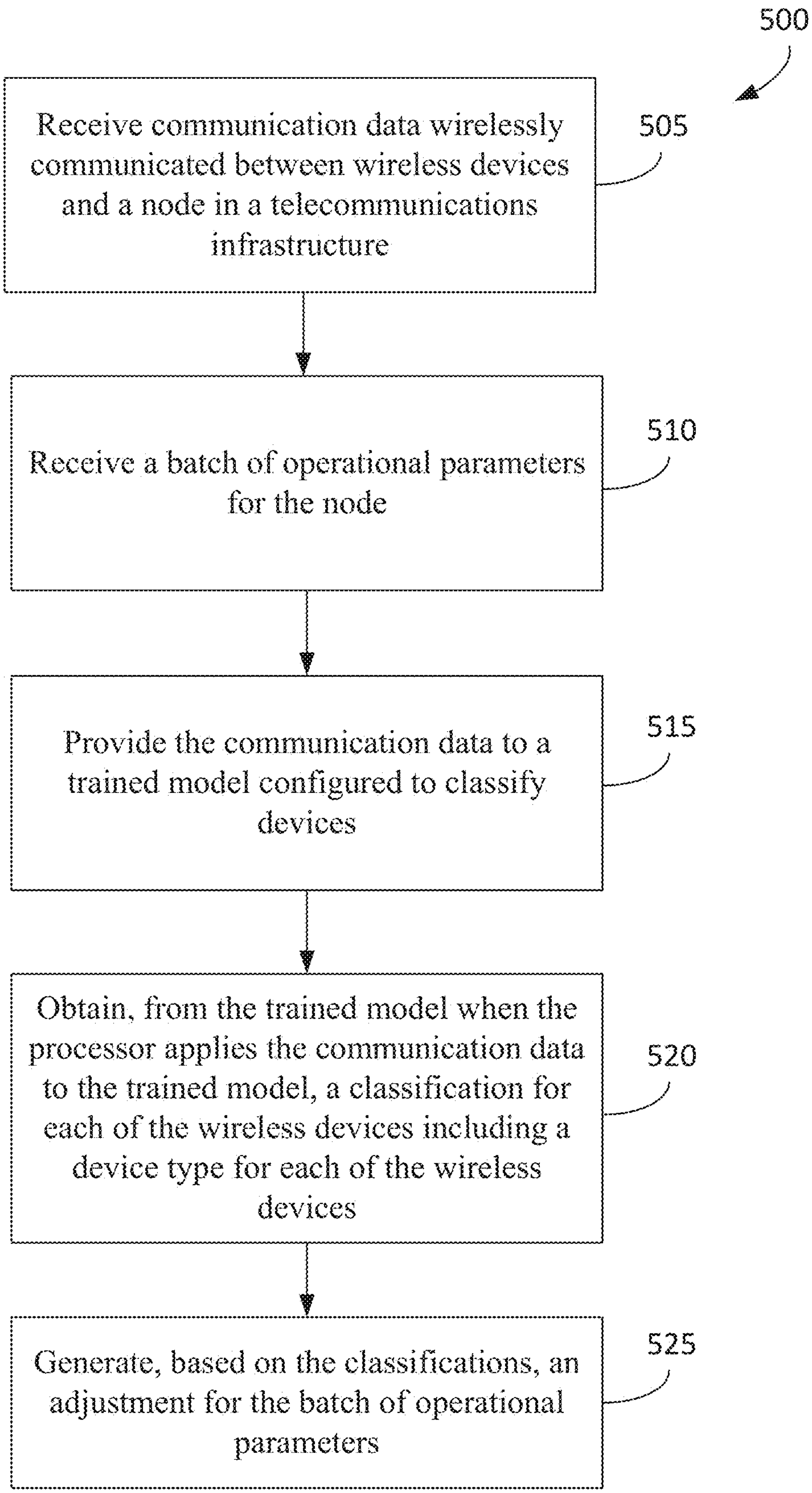
FIG. 5 is a flowchart that illustrates an example of optimization processing by the computing device.

Turning to FIG. 5, a process 500 for optimizing a radio access network is illustrated. The process 500 is described as being carried out by the computing device 120 and in conjunction with the telecommunications infrastructure 110 described above. For example, the processor 122 of the computing device 120 (e.g., based on executing instructions stored in the memory 123) may execute the process 500. However, in some embodiments, the process 500 is implemented by another system and/or in conjunction with another telecommunications infrastructure. Additionally, although the blocks of the process 500 are illustrated in a particular order, in some embodiments, one or more of the blocks may be executed partially or entirely in parallel, may be executed in a different order than illustrated in FIG. 5, or may be bypassed.

In block 505, a computing device receives communication data wirelessly communicated between wireless devices and a node in a telecommunications infrastructure. For example, the computing device 120 (e.g., of FIGS. 1A-B, 2, and 4) receives communication data wirelessly communicated between user equipment (e.g., one or more of the UE (1) through UE (N) of FIG. 3) and a node of the radio access network 112 (e.g., a node of FIG. 3 or node 400 of FIG. 4). With reference to FIGS. 1A-B and 2, the computing device 120 may receive the communication data, via the data port 124, from the telecommunications infrastructure 110. For example, and with reference to FIG. 4, the computing device 120 may receive the communications data from the node 400 or base station 430 (e.g., via temporary link 450) or from the on-site data center 116 (e.g., via on-site data center link 470). The communication data may include data transmitted from the wireless devices to the radio access network 112, from the radio access network 112 to the wireless devices, or a combination thereof.

In block 510, the computing device receives a batch of operational parameters for the node. For example, the computing device 120 (e.g., the processor 122 thereof) may receive the batch of operational parameters for the node 400 via the data port 124. The computing device 120 may receive the batch of operational parameters, for example, from the node 400 or base station 430 (e.g., via temporary link 450) or from the on-site data center 116 (e.g., via on-site data center link 470).

The batch of operational parameters may include, for example, current operational parameters for the node 400 or the radio access network of the node 400, which include node settings that govern performance metrics for the node 400. For example, the operational parameters 435 of FIG. 4 are an example of the batch of operational parameters that the computing device 120 may receive.

In block 515, the computing device provides the communication data to a trained model configured to classify devices (e.g., the trained classifier model 200). For example, the processor 122 may execute the trained classifier model 200 or a device in communication with the processor 122 may execute the trained classifier model 200, and the processor 122 may transmit or input the communication data to the trained classifier model 200 for processing.

The trained classifier model 200 may process the communication data and output classifications of the wireless devices corresponding to the communication data. For example, as described above, the trained classifier model 200 may be a machine learning model that has been trained to classify communication data to characterize the wireless devices that transmitted or received data of the communication data. The classifications may include, for one or more (or each) wireless device corresponding to the communication data, an identity of the wireless device, a type of the wireless device, a data consumption rate of the wireless device, a data type for data consumed by the wireless device, and a mobility state of the wireless device. The identity of the wireless device may be, for example, a unique identifier or address of the wireless device. The type of wireless device may indicate a type of device, selected from a plurality of potential types of devices, that the wireless device is, such as, for example, one of a tablet, a telephone, a smartphone, an appliance, a particular appliance (e.g., one of a washer, dryer, refrigerator, oven, etc.), an Internet of Things (IoT) device, a smart vehicle, an unmanned aerial vehicle, a modem, a laptop, a computing device, a television set, a set-top box, a digital video recorder (DVR), a wireless access point, a router, a gateway, a network switch, a set-back box, a control box, a television converter, a television recording device, a media player, an Internet streaming device, a mesh network node, and/or another device type. The data consumption rate may indicate a quantity of data transmitted and/or received by the wireless device to/from the node over a certain period of time (e.g., bits per second, bytes per hour, etc.). The data type may indicate a type of data being transmitted and/or received by the wireless device to/from the node (e.g., audio call, video call, audio streaming, video streaming, gaming, text messaging, location services, other "app" data, etc.). The mobility state may indicate whether the wireless device is stationary or in motion within the radio access network. Certain devices that do not typically move during or between operations (e.g., an appliance, a television set, etc.) may generally be stationary. Other devices may be stationary at some times and may be in motion (or mobile) at other times (e.g., a tablet, smart phone, a smart vehicle, etc.).

In block 520, the computing device obtains, from the trained model when the processor applies the communication data to the trained model, the classification for each of the wireless devices including at least a device type for each of the wireless devices. For example, the computing device 120 may obtain, from the trained classifier model 200, the classifications generated by the trained classifier model 200 by processing the communication data. The classifications may include the device type for each wireless device. In some examples, the classifications received by the computing device 120 in block 520 also include, for each wireless device, one or more of the identity of the wireless device, the data consumption rate, the data type for data consumed by the wireless device, and the mobility state of the wireless device. In some examples, the classifications received by the computing device 120 in block 520 include a different combination of the information output by the trained classifier model (e.g., a different combination of the identity of the wireless device, the type wireless device, the data consumption rate, the data type for data consumed by the wireless device, and the mobility state for the wireless devices).

In some examples, the classifications may be specific to an instant in time (e.g., a particular time of day on a particular date). In some examples, the classifications correspond to a window of time. The window of time may be an hour, a few hours (e.g., covering a morning commute, morning of a weekday, lunch hour, afternoon of a weekday, an evening commute, weekend morning, weekend evening, etc.), one or more days, or one or more weeks. When the classifications are directed to windows in time, the classifications may include the information organized in terms of averages, minimums, maximums, or other formats.

As an example, the classifications in one case may indicate that the node 400 is connected to 20 phones, 5 cars, 10 smart watches, 20 TVs, 5 tablets at a moment in time, or in average over a time window, or as a minimum (or maximum) of each type of device over a time window, and in another case indicate that the node 400 is connected to 40 phones, 2 cars, 8 smart watches, 25 televisions, 15 tablets, 6 refrigerators, and 3 washers at another moment in time, or in average over another time window, or as a minimum (or maximum) of each type of device over the time window. The classifications may indicate many other quantities and types of wireless devices in other examples, depending on the wireless devices in communication with the node 400 that generate the communication data. Additionally, the classifications may indicate whether each of these devices is stationary or in motion. In some examples, the classifications may further indicate, for each of the wireless devices, one or more of the identity the wireless device, the data consumption rate of the wireless device, and/or the data types for data consumed by the wireless device.

In block 525, the computing device generates, based on the classifications, an adjustment for the batch of operational parameters. For example, the computing device 120 may generate, as the adjustment, a value of a node setting of the operational parameters 435. The computing device 120 may output the adjustment to the node 400 (e.g., to the base station 430 of the node) such that the node 400 may update the operational parameters 435 based on the adjustment and thereby implement the adjustment. The computing device 120 may communicate the adjustment to the node 400 directly (see, e.g., FIG. 1B and the temporary link 450 of FIG. 4) or indirectly (see, e.g., FIG. 1A and the on-site data center link 470 of FIG. 4). After the operational parameters 435 are updated based on the adjustment, the node 400 may apply the updated operational parameters to communications between the node 400 and wireless devices. For example, the node 400 may configure, according to the updated operational parameters, one or more of transmission power level(s) for signal emissions from the node, antenna gain parameter(s), coverage area(s) of the node, beamwidth of signals to the node, beamwidth of signals from the node, spectrum allocation(s) for the node, spectrum allocation(s) for wireless devices in communication with the node, handover configuration parameter(s), load balancing parameter(s), power control parameter(s), measurement threshold parameter(s), slicing parameter(s), rate control parameter(s), scheduler parameter(s), and any other parameter for carrying out communications with user equipment UE (1) through UE (N).

The computing device 120 may perform the process 500 and generate the adjustment in real-time or in non-real time. Real-time adjustments enable real-time optimization of the node 400 to impact communications on-the-fly (e.g., impacting the communication links between a UE and the node that generated the communication data and are still present). Non-real time adjustments may be used to optimize the node 400 for future operation. For example, communication data may be obtained for a particular time window (e.g., during weekday morning commute), processed by the trained classifier model to generate classifications, and the computing device 120 may generate adjustments based on the classifications with the intent to optimize the node for operation during future weekday morning commutes.

The real-time adjustments may include node settings that are specific to one or more of the wireless devices, or one or more types of the wireless devices, that correspond to the communication data received in block 505. For example, the real-time adjustments may cause the node 400 to increase a transmission power level or spectrum allocation for a first UE that is receiving or transmitting data of a type that is associated with low latency requirements or preferences, and/or to decrease a transmission power level or spectrum allocation for a second UE that is receiving or transmitting data that is not associated with a low latency requirement or preference. For example, the first UE may be an autonomous vehicle receiving map data for navigating a road or a mobile phone that is streaming a video, while the second UE may be an appliance or IoT device that is periodically reporting non-time critical operational or maintenance data. The real-time adjustments may be made to adjust operational parameters for the UEs corresponding to the communication data, which may include tens or hundreds of UEs, which may improve utilization of the node 400 and its available resources such that the experiences of users of the UEs may experience improved services.

The non-real time adjustments may include node settings that are specific to types of wireless devices and/or that are selected so that the node 400 can allocate resources to UEs based on expected demand as learned from the classifications.

The computing device 120 may generate the adjustment for the batch of operational parameters based on a set of rules, based on use of a further trained model, and/or based on simulations using a simulation model or digital twin of the node 400. For example, the computing device 120 may have a set of rules (e.g., stored in the memory 123) that map particular classifications to particular adjustments of the batch of operational parameters. For example, the set of rules may indicate that each UE classified as a certain type, communicating a certain data type or at a certain data rate, and/or that is mobile, should have a particular adjustment (e.g., the adjustment may include a particular value or values for one or more node settings), while UEs classified in another way should have a different particular adjustment. As another example, the set of rules may map a particular combination of UE types and quantities indicated by the classification to a particular adjustment.

In some examples, the computing device 120 may generate the adjustment using a further trained model (e.g., the trained parameter model 205). As described above, the trained parameter model 205 may be a machine learning model that has been trained to generate values for operational parameters (e.g., values for node settings of the operational parameters 435) to improve or optimize performance of the node or radio access network 112. Accordingly, in some examples, the computing device 120 may provide to the trained parameter model 205 the classifications obtained in block 520, and in some examples, also the batch of operational parameters received in block 510 and/or characteristics of the node 400. For example, the processor 122 may execute the trained parameter model 205 or a remote processing resource in communication with the processor 122 may execute the trained parameter model 205, and the processor 122 may transmit or input the classifications, with or without the batch of operational parameters and/or characteristics of the node 400, to the trained parameter model 205 for processing. The trained parameter model 205 may process the input data and output the adjustment for the batch of operational parameters. The adjustment may include a value for each of operational parameters of the batch of operational parameters or may include one or more values for a subset of the batch of operational parameters.

As another example, the computing device 120 may generate the adjustment using a computer-generated simulation model, also referred to as a digital twin, of the node 400 or radio access network 112. The digital twin may be configured according to characteristics of the node 400 to provide accurate simulation of the node 400. The computing device 120, or a remote processing resource in communication with the computing device 120, may execute the digital twin to generate a virtual node that imitates the node 400 in a virtual environment. Further, within the virtual environment, the computing device 120 may generate virtual UEs based on the classifications to simulate the communications between node 400 and the UEs.

The digital twin may further be associated with performance metrics, similar to how the node 400 may be associated with performance metrics. That is, the computing device 120 may generate such performance metrics for the digital twin when simulating different scenarios. Each scenario may include a particular set of virtual UEs (as defined by different classifications received in block 520) and a particular batch of operational parameters for the virtual node. The batch of operational parameters may be defined by the computing device 120 for the virtual node (e.g., by assigning values for the various node settings of the virtual node) and may be varied to simulate and evaluate the node communicating under different configurations with the UEs.

The performance metrics may include key performance indicators that measure the performance for various aspects of the telecommunications infrastructure 110. The key performance indicators may include, but are not limited to, packet loss, data throughput, network latency, handover success rate, and/or other metrics that may quantify the performance of the radio access network 112. Network latency is a measure of the round-trip time for IP packets to travel from a node to any user equipment UE (1) through UE (N) identified in the operational parameters. Data throughput is a measure of the data transfer rate between a node and any user equipment UE (1) through UE (N) identified in the operational parameters. Packet loss is a measure of the reliability of data transmission between a node and any user equipment UE (1) through UE (N) identified in the operational parameters. The handover success rate is a measure of the effectiveness of the handover processing by the telecommunications infrastructure 110.

In some examples, to use the digital twin to generate the adjustment in block 525, the computing device 120 may iteratively apply potential adjustments to the batch of operational parameters to the digital twin in the virtual environment with the virtual UEs representing the UEs corresponding to the communication data, and assess the performance metrics of the digital twin that result for each potential adjustment. In some examples, the computing device 120 uses the trained parameter model 205 to generate a plurality of adjustments for the batch of operational parameters, where each adjustment for the batch of operational parameters includes a set of one or more values to adjust one or more corresponding node settings. The computing device 120 then uses the plurality of adjustments as the potential adjustments, and applies the potential adjustments iteratively to the digital twin. The computing device may generate performance metrics for each potential adjustment to determine the potential adjustment associated with a preferred or optimal set of performance metrics. The potential adjustment determined to be associated with a preferred or optimal set of performance metrics may be used as the adjustment for the batch of operational parameters that the computing device generates in block 525. In some examples, the performance metrics generated based on a particular potential adjustment to the batch of operational parameters may be fed back to the trained parameter model 205 to further train the trained parameter model 205. For example, the particular potential adjustment and resulting performance metrics may serve as further training data that is used to further train (and, thus, update) the trained parameter model 205.

In some examples, to use the digital twin to generate the adjustment in block 525, the computing device 120 may apply a potential adjustment, or iteratively apply potential adjustments, to the batch of operational parameters to the digital twin in the virtual environment with the virtual UEs representing the UEs corresponding to the communication data, and assess the performance metrics of the digital twin that result for the potential adjustment (or for each iteration of potential adjustments). The assessment may include the computing device 120 comparing the performance metrics that result from the potential adjustment (or for each iteration of potential adjustments) to performance metrics of the node 400. The computing device 120 may then determine to use the potential adjustment (or an iteration of the potential adjustments) as the adjustment that the computing device 120 generated in block 525 when the corresponding performance metrics of the virtual node are improved relative to the performance metrics of the node 400. Accordingly, the computing device 120 is configured to determine, by applying a potential adjustment to the digital twin, whether a performance of the digital twin is improved over a performance of the node 400, and to generate the adjustment when the performance of the digital twin is determined to improve over the performance of the node 400.

In some examples, the communication data, wireless devices, and node of the process 500 are associated with multiple carriers. For example, the node may be a multi-carrier node communicating with wireless device (first UEs) of a first carrier as well as with wireless devices (second UEs) of a second carrier. In further examples, the node may communicate with wireless devices of one or more additional carriers as well.

Although the process 500 and variations thereof are described above with respect to one node, a similar process and variations thereof may be implemented with respect to a partial sector of the node, with respect one or a subset of carriers of the node serving as a multi-carrier node, and/or with respect to two or more nodes of a radio access network (e.g., of the radio access network 112). For example, the communication data received in block 505 may include communication data wirelessly communicated between wireless devices and two or more nodes in the radio access network 112 of the telecommunications infrastructure 110; the batch of operational parameters received in block 510 may include operational parameters for the two or more nodes; the communication data provided to the trained model may include the communication data received in block 505 with respect to the two or more nodes; the classification for each of the wireless devices obtained from the trained model in block 510 may include classifications for each of the wireless devices associated with the communication data received in block 505 with respect to the two or more nodes; and the adjustment generated in block 525 may apply to the batch of operational parameters for the two or more nodes. Accordingly, adjustment may be generated for operational parameters of two more nodes based on the classifications corresponding to the two or more nodes. The adjustment may be generated in block 525 using a set of rules, a second trained model (e.g., the trained parameter model 205), and/or a digital twin of the two or more nodes, as discussed above.

The process 500 for optimizing a radio access network in FIG. 5 may improve mobility robustness and user experience. The optimization processing of FIG. 5 may also modify the overall performance of the radio access network 112 and improve the wireless communication infrastructure by improving or maximizing the various aspects of the wireless connectivity. Benefits of modifying the configuration for any node (1) through node (X) to which the optimization processing of FIG. 5 may include, but are not limited to, reduction in latency in the radio access network 112, minimization of coverage gaps in the radio access network 112, reduction of communication disruptions in the radio access network 112, reduction of bandwidth usage in the radio access network 112, improved efficiency and quality of service in the radio access network 112, and/or other benefits to the radio access network 112. These benefits may result in improvements to the maintenance of the telecommunications infrastructure 110. These benefits may also result in a reduction in the overall cost for operating the telecommunications infrastructure 110 and an increase in the revenue opportunities for the entity that owns or leases the on-site data center 116. These benefits of the optimization processing of FIG. 5 may improve the overall performance of the telecommunications infrastructure 110.

In some examples, aspects of the technology, including computerized implementations of methods according to the technology, may be implemented as a system, method, apparatus, or article of manufacture using standard programming or engineering techniques to produce software, firmware, hardware, or any combination thereof to control a processor, also referred to as an electronic processor, (e.g., a serial or parallel processor chip or specialized processor chip, a single- or multi-core chip, a microprocessor, a field programmable gate array, any variety of combinations of a control unit, arithmetic logic unit, and processor register, and so on), a computer (e.g., a processor operatively coupled to a memory), or another electronically operated controller to implement aspects detailed herein.

Accordingly, for example, examples of the technology may be implemented as a set of instructions, tangibly embodied on a non-transitory computer-readable media, such that a processor may implement the instructions based upon reading the instructions from the computer-readable media. Some examples of the technology may include (or utilize) a control device such as, e.g., an automation device, a special purpose or programmable computer including various computer hardware, software, firmware, and so on, consistent with the discussion herein. As specific examples, a control device may include a processor, a microcontroller, a field-programmable gate array, a programmable logic controller, logic gates etc., and other typical components that are known in the art for implementation of appropriate functionality (e.g., memory, communication systems, power sources, user interfaces, and other inputs, etc.).

Certain operations of methods according to the technology, or of systems executing those methods, may be represented schematically in the figures or otherwise discussed herein. Unless otherwise specified or limited, representation in the figures of particular operations in particular spatial order may not necessarily require those operations to be executed in a particular sequence corresponding to the particular spatial order. Correspondingly, certain operations represented in the figures, or otherwise disclosed herein, may be executed in different orders than are expressly illustrated or described, as appropriate for particular examples of the technology. Further, in some examples, certain operations may be executed in parallel or partially in parallel, including by dedicated parallel processing devices, or separate computing devices 120 configured to interoperate as part of a large system.

As used herein in the context of computer implementation, unless otherwise specified or limited, the terms "component," "system," "module," "block," and the like are intended to encompass part or all of computer-related systems that include hardware, software, a combination of hardware and software, or software in execution. For example, a component may be, but is not limited to being, a processor device, a process being executed (or executable) by a processor device, an object, an executable, a thread of execution, a computer program, or a computer. By way of illustration, both an application running on a computer and the computer may be a component. A component (or system, module, and so on) may reside within a process or thread of execution, may be localized on one computer, may be distributed between two or more computers or other processor devices, or may be included within another component (or system, module, and so on).

Also as used herein, unless otherwise limited or defined, "or" indicates a non-exclusive list of components or operations that may be present in any variety of combinations, rather than an exclusive list of components that may be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as, e.g., "either," "only one of," or "exactly one of." Further, a list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of each of A, B, and C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C. In general, the term "or" as used herein only indicates exclusive alternatives (e.g., "one or the other but not both") when preceded by terms of exclusivity, such as, e.g., "either," "only one of," or "exactly one of."

In the description above and the claims below, the term "connected" may refer to a physical connection or a logical connection. A physical connection indicates that at least two devices or systems co-operate, communicate, or interact with each other, and are in direct physical or electrical contact with each other. For example, two devices are physically connected via an electrical cable. A logical connection indicates that at least two devices or systems co-operate, communicate, or interact with each other, but may or may not be in direct physical or electrical contact with each other. Throughout the description and claims, the term "coupled" may be used to show a logical connection that is not necessarily a physical connection. "Co-operation," "the communication," "interaction" and their variations include at least one of: (i) transmitting of information to a device or system; or (ii) receiving of information by a device or system.

Any mark, if referenced herein, may be common law or registered trademarks of third parties affiliated or unaffiliated with the applicant or the assignee. Use of these marks is by way of example and shall not be construed as descriptive or to limit the scope of disclosed or claimed embodiments to material associated only with such marks.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Throughout the application, ordinal numbers (e.g., first, second, third, etc.) may be used as an adjective for an element (i.e., any noun in the application). Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section.

The use of ordinal numbers is not to imply or create any particular ordering of the elements nor to limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. Thus, a first member, component, region, layer, or section referred to in examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application.

Unless otherwise indicated, like parts and method steps are referred to with like reference numerals.

Although the present technology has been described by referring to certain examples, workers skilled in the art will recognize that changes may be made in form and detail without departing from the scope of the discussion.

What is claimed is:

1. A computing device comprising:
- a data port configured to:
  - receive communication data wirelessly communicated between wireless devices and a node in a telecommunications infrastructure; and
  - receive a batch of operational parameters for the node; and
- a processor in communication with the data port and configured to:
  - provide the communication data to a trained model configured to classify devices;
  - obtain, from the trained model when the processor applies the communication data to the trained model, a classification for each of the wireless devices including a device type for each of the wireless devices; and
  - generate, based on the classifications, an adjustment for the batch of operational parameters.

2. The computing device according to claim 1, wherein the classification further includes at least one from a group of a mobility state for each of the wireless devices, an identity of each of the wireless devices, a data consumption rate of each of the wireless devices, a data type for data consumed by each of the wireless devices, or a mobility state of each of the wireless devices.

3. The computing device according to claim 1, wherein, to generate the adjustment, the processor is to:
- apply the classifications to a second trained model, and
- receive, from the second trained model, an output indicative of the adjustment.

4. The computing device according to claim 3, wherein the processor is configured to:
- use a digital twin of the node, generated based on characteristics of the node, to simulate the node and to generate the output indicative of the adjustment.

5. The computing device according to claim 4, wherein, to use the digital twin of the node, the processor is configured to:
- determine, by applying the adjustment to the digital twin, whether a performance of the digital twin is improved over a performance of the node, and
- generate the adjustment when the performance of the digital twin is determined to improve over the performance of the node.

6. The computing device according to claim 4, wherein, to further train the second trained model, the processor is configured to:
- generate, using the second trained model, a potential adjustment for the batch of operational parameters;
- apply the potential adjustment for the batch of operational parameter to the digital twin; and
- update the second trained model based on a performance of the digital twin with the potential adjustment.

7. The computing device according to claim 1, wherein the batch of operational parameters comprise node settings that govern performance metrics for the node.

8. The computing device according to claim 1, wherein the processor is configured to:
- transmit the adjustment for the batch of operational parameters to the node to modify operation of the node.

9. A method comprising:
- receiving communication data wirelessly communicated between wireless devices and a node in a telecommunications infrastructure;
- receiving a batch of operational parameters for the node;
- providing, by a processor, the communication data to a trained model configured to classify devices;
- obtaining, from the trained model when the processor applies the communication data to the trained model, a classification for each of the wireless devices including a device type for each of the wireless devices; and
- generating, based on the classifications, an adjustment for the batch of operational parameters.

10. The method of claim 9, wherein generating the adjustment comprises:
- applying the classifications to a second trained model, and
- receiving, from the second trained model, an output indicative of the adjustment.

11. The method of claim 10, further comprising:
- using a digital twin of the node, generated based on characteristics of the node, to simulate the node and to generate the output indicative of the adjustment.

12. The method of claim 11, further comprising further training the second trained model, where further training the second trained model comprises:
- generating, using the second trained model, a potential adjustment for the batch of operational parameters;
- applying the potential adjustment for the batch of operational parameter to the digital twin; and
- updating the second trained model based on a performance of the digital twin with the potential adjustment.

13. The method of claim 9, further comprising:
- transmitting the adjustment for the batch of operational parameters to the node to modify operation of the node.

14. A non-transitory machine-readable storage medium having stored thereon machine-readable instructions that, when executed by a processor, cause the processor to:
- receive communication data wirelessly communicated between wireless devices and a node in a telecommunications infrastructure;
- receive a batch of operational parameters for the node;
- provide the communication data to a trained model configured to classify devices;
- obtain, from the trained model when the communication data is applied to the trained model, a classification for each of the wireless devices including a device type for each of the wireless devices; and
- generate, based on the classifications, an adjustment for the batch of operational parameters.

15. The machine-readable storage medium of claim 14, wherein, to generate the adjustment, the machine-readable instructions, when executed, cause the processor to:
- apply the classifications to a second trained model, and
- receive, from the second trained model, an output indicative of the adjustment.

16. The machine-readable storage medium of claim 15, wherein the machine-readable instructions, when executed, cause the processor to:
- use a digital twin of the node, generated based on characteristics of the node, to simulate the node and to generate the output indicative of the adjustment.

17. The machine-readable storage medium of claim 16, wherein, to use the digital twin of the node, the machine-readable instructions, when executed, cause the processor to:

determine, by applying the adjustment to the digital twin, whether a performance of the digital twin is improved over a performance of the node, and generate the adjustment when the performance of the digital twin is determined to improve over the performance of the node.

18. The machine-readable storage medium of claim 16, wherein, to further train the second trained model, the machine-readable instructions, when executed, cause the processor to:

generate, using the second trained model, a potential adjustment for the batch of operational parameters;

apply the potential adjustment for the batch of operational parameter to the digital twin; and update the second trained model based on a performance of the digital twin with the potential adjustment.

19. The machine-readable storage medium of claim 14, wherein the batch of operational parameters comprise node settings that govern performance metrics for the node.

20. The machine-readable storage medium of claim 14, wherein the machine-readable instructions, when executed, cause the processor to:

transmit the adjustment for the batch of operational parameters to the node to modify operation of the node.

* * * * *